United States Patent Office 3,234,260
Patented Feb. 8, 1966

3,234,260
ISOPROPYL 2,4-DINITRO-6-SEC.-BUTYLPHENYL
CARBONATE
Max Pianka and Donald John Polton, Hertfordshire,
England, assignors to The Murphy Chemical Company
Limited, St. Albans, England, a British company
No Drawing. Filed Mar. 15, 1962, Ser. No. 180,013
Claims priority, application Great Britain, Mar. 22, 1961,
10,501/61
1 Claim. (Cl. 260—463)

This invention is concerned with improvements in or relating to pesticides.

We have found that a novel group of organic carbonate esters have marked pesticidal activity, individual esters of the group possessing pesticidal activity in one or more of the following capacities: acaricidal, ovicidal, fungicidal, and insecticidal. Whilst some of the esters appear to possess significant activity against one particular pest, others possess activity against two or more pests. For example, some of the esters have marked acaricidal and ovicidal activity, whilst others are active against two different fungi. It will be appreciated that this dual activity is highly important in agriculture and horticulture.

Since the compounds according to the invention are not organophosphorus compounds they provide an alternative source of pesticides thereto, particularly for use in the control of mites resistant to organophosphorus compounds.

The present invention, therefore, provides as new compounds, compounds of the general formula:

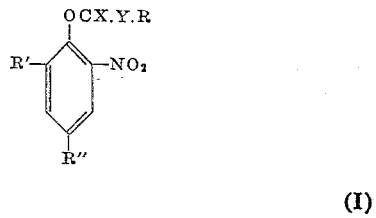

in which:

X and Y are the same or different and each is an oxygen or a sulphur atom;
R is a saturated or unsaturated aliphatic hydrocaron residue which may be substituted with one or more of the following substituents:
halogen atoms, amino groups, substituted amino groups, salted amino groups, hydroxyl groups, aryl groups, acyl groups, alkoxy groups, alkylthio groups, alicyclic and heterocyclic groups; or is a phenyl, chlorophenyl, nitrophenyl, naphthyl, tolyl, heterocyclic or alicyclic group;
one of the groups R' and R" is a nitro group and the other is an aliphatic hydocarbon group having at least three carbon atoms, a phenyl, substituted phenyl, cyclohexyl or substituted cyclohexyl group.

R may, for example, be an alkyl group containing 1–18 carbon atoms, preferably 1–12 carbon atoms, e.g. methyl, ethyl, propyl, isopropyl, butyl, decyl etc.

R may however be an unsaturated aliphatic group e.g. an allyl or substituted allyl group.

As stated above X and Y may be the same or different and each represents an oxygen or sulphur atom. In general, the carbonates (X=Y=O), thionothiolocarbonates (X=Y=S) or thiolocarbonates (X=O; Y=S) are preferred due to their generally better pesticidal activity.

Where R' or R" is other than a nitro group this may, for example, be a branched aliphatic hydrocarbon group containing 3–12 carbon atoms. It is preferred that the group R" be a nitro group.

Compounds according to the invention which are especially valuable in view of their important pesticidal activity are those having the formula:

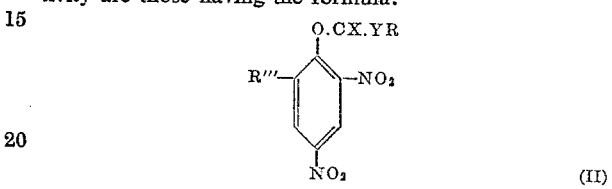

where R, X and Y have the meanings defined above and R''' is a branched alkyl group containing 3–8, preferably 4–8, carbon atoms.

Particularly useful compounds of Formula II are those in which R''' represents a sec.-butyl group

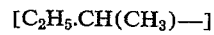

a tertiary butyl group [(CH₃)₃.C—], a 1-methylbutyl group [C₃H₇.CH.(CH₃)—] or a 1-methylheptyl group [C₆H₁₃.CH(CH₃)—].

Many compounds of general Formula II possess good acaricidal activity and some also possess fungicidal activity against powdery mildews, for example cucumber powdery mildew (*Erysiphe cichoracearum*) and apple mildew (*Podosphaera leucotricha*). Some of the compounds of general Formula II also possess ovicidal activity against eggs of mites.

Other compounds of general Formula II, e.g. isopropyl 2,4-dinitro-6-sec.-butylphenyl carbonate also possess activity against the diamond backed caterpillar (*Plutella maculipennis*).

Those compounds of Formula II in which R is a straight or branched chain alkyl group containing from 1 to 8 carbon atoms or is a tetrahydro-furfuryl group, were found to be especially useful, many of them having good multi-pesticidal activity.

Particularly preferred individual compounds according to the invention on account of their outstanding pesticidal activity are the following:

(a) *Isopropyl 2,4-dinitro-6-sec.-butylphenyl carbonate*

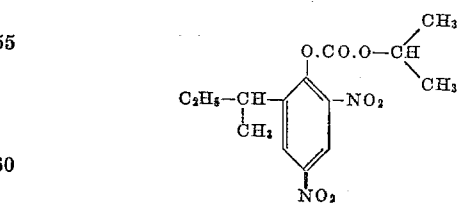

This compound has very good acaricidal activity and has given kills of 100% of spiders resistant to organophosphorus compounds at concentrations as low as 0.001%. It also shows good activity against cucumber powdery mildew, apple mildew and diamond backed caterpillar. This wide range of pesticidal activity makes the compound very important for many horticultural purposes.

(b) *1'-methylheptyl 2,4-dinitro-6-sec.-butylphenyl carbonate*

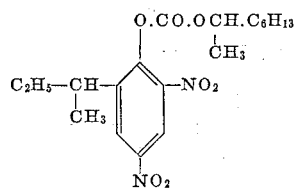

This compound shows very good acaricidal activity.

(c) *1'-methylbutyl 2,4-dinitro-6-sec.-butylphenyl carbonate*

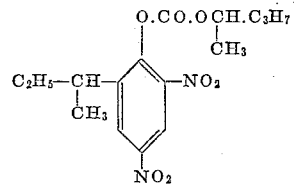

This compound has very good acaricidal activity and has given 100% kills at concentrations of 0.005%. It is also very active against apple mildew and cucumber powdery mildew.

(d) *3'-(and 2'-) methylbutyl 2,4-dinitro-6-sec.-butylphenyl carbonate*

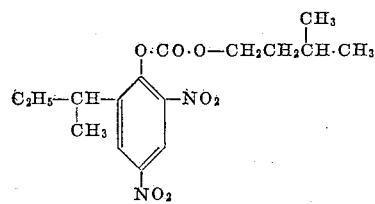

and

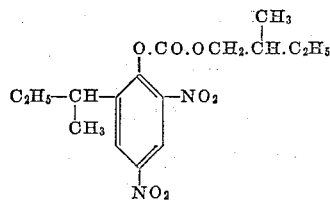

These compounds are outstandingly active against greenhouse red spider and have given kills of 98% at concentration of only 0.001%. They also show good activity against apple mildew.

(e) *α-Tetrahydro-furfuryl 2,4-dinitro-6-sec.-butylphenyl carbonate*

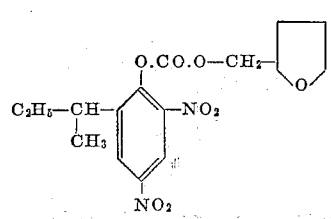

This compound is also very active against greenhouse red spider and has given 100% kills at concentrations as low as 0.0005%. It also shows very good activity against both cucumber powdery mildew and apple mildew.

(f) *Very similar properties are shown by methyl 2,4-dinitro-6-sec.-butylphenyl thiolocarbonate*

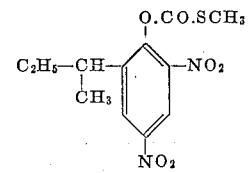

(g) *Methyl 2,4-dinitro-6-tert.-butylphenyl carbonate*

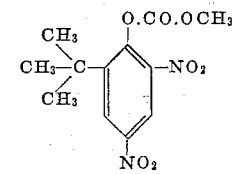

This compound has good activity against greenhouse red spider combined with marked ovicidal activity.

(h) *Ethyl 2,4-dinitro-6-tert.-butylphenyl carbonate*

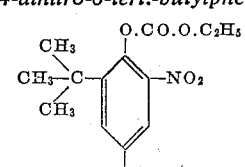

This compound has acaricidal and ovicidal activity (similar to that of the corresponding methyl compound described above) and also possess marked activity against both cucumber powdery mildew and apple mildew.

(i) *n-Hexyl 2,4-dinitro-6-tert.-butylphenyl carbonate*

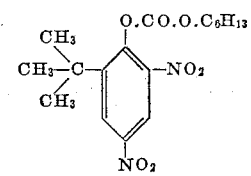

This compound is distinguished by good acaricidal activity.

(j) *Methyl 2,4-dinitro-6-(1'-methylbutyl)-phenyl carbonate*

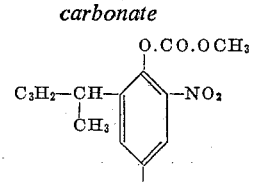

This compound has a good activity against greenhouse red spider as well as good activity both against cucumber powdery mildew and apple mildew.

(k) *Isopropyl 2,4-dinitro-6-(1'-methylbutyl)-phenyl carbonate*

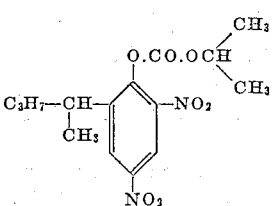

This compound has good activity against greenhouse red spider and also possesses ovicidal activity as well as marked activity against powdery mildew.

(*l*) 3'-(*and* 2'-)*methylbutyl* 2,4-*dinitro*-6-(1"-*methylbutyl*)-*phenyl carbonate*

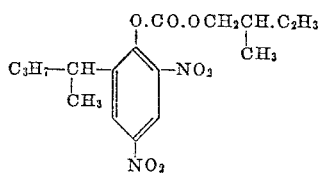

and

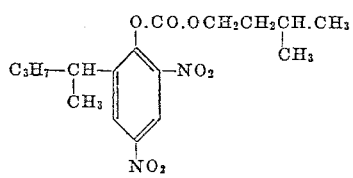

These compounds combine very good activity against greenhouse red spider with good activity against apple mildew.

(*m*) *Ethyl* 2,4-*dinitro*-6-(1'-*methylheptyl*)-*phenyl carbonate*

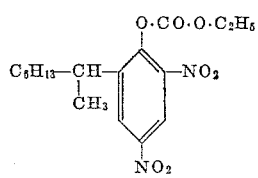

(*n*) *Methyl* 2,4-*dinitro*-6-(1'-*methylheptyl*)-*phenyl carbonate*

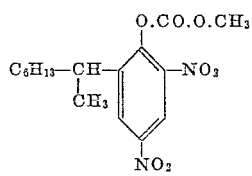

Both compounds (*m*) and (*n*) show a wide range of activity, being active against greenhouse red spider, cucumber powdery mildew, apple mildew, rose mildew and apple scab (*Venturia inaequalis*). Their combined activity against apple mildew and apple scab is of particular importance.

(*o*) *Methyl* 2,4-*dinitro*-6-(1'-*methylheptyl*)-*phenyl thionothiolo-carbonate*

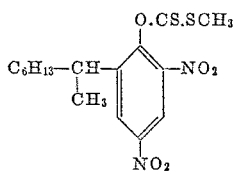

This compound showed good activity against greenhouse red spider and cucumber powdery mildew.

(*p*) *Methyl* 2,4-*dinitro*-6-(1'-*methylheptyl*)-*phenyl thiolo-carbonate*

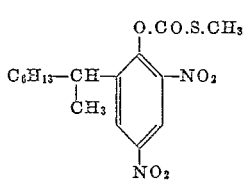

This compound showed good activity against apple mildew and apple scab and also showed excellent eradicant properties towards these fungi. This dual activity is, of course, extremely important in practical application.

Compounds of the formulae

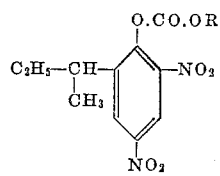 (IIIa)

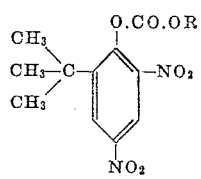 (IIIb)

and

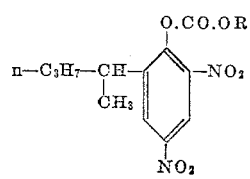 (IIIc)

were found to possess excellent activity against spider mites resistant to organophosphorus compounds such as parathion (O, O-diethyl O-p-nitrophenyl phosphorothioate) and schradan (octamethylpyrophosphoramide). Moreover many compounds of these general formulae also exhibit aphicidal activity against caterpillar.

The compounds according to the invention may be prepared in any desired way. In one convenient method of preparation of compounds of general Formula I, the corresponding phenol:

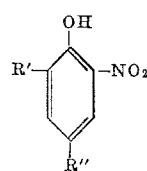 (IV)

where R' and R" have the meanings defined above, may be reacted with a haloformic acid ester of the formula:

$$Z.CX.YR \qquad (V)$$

where X, Y and R have the meanings defined above, and Z is chlorine, bromine or iodine, preferably chlorine. The reaction is preferably conducted in the presence of an acid binding agent, e.g. a tertiary base such as pyridine or dimethylaniline. The reaction is conveniently effected in the presence of an inert solvent such as diethyl ether, benzene or tetrahydrofuran.

The compounds according to the invention may also be prepared by reaction of a phenoxide of the formula:

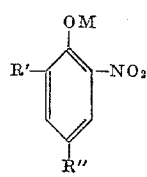 (VI)

(where R' and R" have the meanings defined above and M represents an alkali metal, preferably sodium or potassium) with a haloformic ester of the formula:

$$Z.CV.Y.R \qquad (V)$$

(where X, Y, R and Z have the meanings defined above)

in solution in an inert organic solvent. Particularly suitable solvents for this reaction are ketones, e.g. acetone.

The phenoxide of Formula VI may be preformed or, preferably, may be formed in situ in the inert organic solvent prior to introduction of the haloformic acid ester by reaction of the parent phenol with a suitable alkali metal compound, e.g. the hydroxide, carbonate or bicarbonate.

The preparation of the compounds according to the invention by the reaction of a phenoxide of general Formula VI with a compound of general Formula V is particularly advantageous since the use of the phenoxide in place of the parent phenol (IV) and a tertiary base leads, in general, to improve yields being obtained.

However, another advantageous method of preparing the compounds according to the invention comprises the simultaneous reaction of the parent phenol (IV) with a haloformic acid ester (V) in an inert organic solvent (e.g. a ketone such as acetone) in the presence of an alkali metal carbonate or alkali metal bicarbonate, preferably an alkali metal carbonate. By using this method, it is also possible to obtain improved yields as compared with the use of the parent phenol (IV) and a tertiary base. It is to be observed that alkali metal hydroxides cannot be used in place of alkali metal carbonate or alkali metal bicarbonate since these will decompose the haloformic acid ester.

The haloformic acid esters (V) may conveniently be prepared by reaction of a compound of the formula RYH with a compound of the formula $CXZ_2$ according to the equation:

$$RYH + CXZ_2 \rightarrow Z.CX.Y.R + HZ$$

Thus, the preferred chloroformic acid esters may be produced by the following reactions:

$$ROH + COCl_2 \rightarrow Cl.COOR + HCl$$
$$RSH + CSCl_2 \rightarrow Cl.CSSR + HCl$$
$$ROH + CSCl_2 \rightarrow Cl.CS.OR + HCl$$
$$RSH + COCl_2 \rightarrow Cl.CO.SR + HCl$$

In general, these reactions may be carried out in the presence of aluminum chloride as catalyst and where required in the presence of an acid binding agent.

The new compounds according to the invention can be formulated for use in any desired way. Generally such formulations will include the compound in association with a suitable carrier or diluent. Such carriers may be liquid or solid and designed to aid the application of the compound either by way of dispersing it where it is to be applied or to provide a formulation which can be made by the user into a dispersible preparation.

Liquid preparations thus include preparations of the compound in the form of solutions or emulsions which can be used on their own or be adapted to be made up with water or other diluents to form sprays etc.; in such cases the carrier is a solvent or emulsion base non-phytotoxic under the conditions of use. Generally such preparations will include a wetting, dispersing or emulsifying agent. Other liquid preparations include aerosols in which the compound is associated with a liquid carrier or propellant.

Solid preparations include dusts and wettable powders, granulates and pellets, and semi-solid preparations such as pastes. Such preparations may include inert solid or liquid diluents such as clays, which may themselves have wetting properties, and/or wetting, dispersing or emulsifying agents; binding and/or adhesive agents may also be included. Solid preparations also include thermal fumigating mixtures wherein the compound is associated with a solid pyrotechnic component.

For the better understanding of the invention, the following examples are given by way of illustration only. In these examples temperatures are given in degrees centigrade, and parts, unless otherwise stated are by weight. Where parts by weight and parts by volume are mentioned together these are to be taken as having the relationship of grams to cubic centimeters. Reference in the examples to "resistant" spiders indicates that these were substantially resistant to attack by organophosphorous compounds such as, for example, parathion and schradan.

The tests against cucumber powdery mildew (*Erysiphe cichoracearum*), apple mildew (*Podosphaera leucotricha*) and apple scab (*Venturia inaequalis*) were effected as follows:

*Test for activity against* Erysiphe cichoracearum

The wettable powder was diluted with water to obtain the required concentration of the toxicant. Cucumber plants were sprayed with this dilution and placed in a greenhouse under artifiicial illumination. Spores of cucumber mildew were blown on to the plants. Another spraying was carried out after 10 days and the incidence of infection assessed at the end of the treatment. Where a dust is indicated in the tables, the cucumber plants were dusted with a dust prepared by mixing 5 parts of the toxicant with 95 parts of china clay instead of being sprayed with the wettable powder. Otherwise the technique of infection and the assessment of the incidence of the infection after treatment were the same.

*Test for activity against* Podosphaera leucotricha

The wettable powder was diluted with water to the required concentration of the toxicant. Apple rootstocks placed in a greenhouse under artificial illumination were sprayed with this dilution. Spores of apple mildew were blown on to the rootstocks. Two further applications at 10-day intervals were made and the incidence of infection was assessed at the end of the treatment.

*Test for activity against* Venturia inaequalis

The formulated toxicant was diluted with water to obtain the required concentration of the toxicant. Apple rootstocks were sprayed under artificial illumination with this mixture. After several hours the deposit had dried. On the same day the rootstocks were placed in an infection chamber and the upper surfaces of the leaves were sprayed with a suspension containing approx. 500,000 spores of *Venturia inaequalis* per cc. After 48 hours the rootstocks were removed from the infection chamber and placed in a greenhouse under artificial illumination. The infection incidence was then assessed after 21 days.

EXAMPLE 1

*Isopropyl 2,4-dinitro-6-sec.-butylphenyl carbonate*

The basic equations underlying the preparation of this compound are:

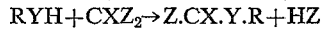
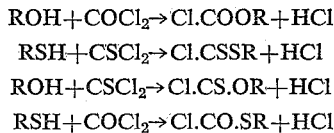
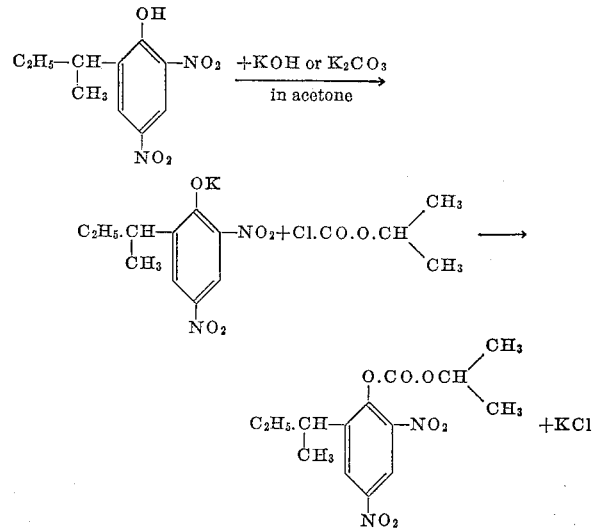

2,4-dinitro-6-sec.-butylphenol (96.6% pure, 49.7 g.) was dissolved with stirring in acetone (400 cc.). To the solution was added potassium hydroxide (11.2 g.) and the mixture stirred till all reactants were in solution. To this solution was added, all at once, a solution of isopropyl chloroformate (96% pure, 25.3 g.) in acetone (100 cc.). The mixture was refluxed for 2 hours. After cooling, the precipitated potassium chloride was filtered off, washed with a little acetone, dried and weighed. Weight of potassium chloride was 14.5 g. (98% of theoretical). The acetone was then stripped off. To the residue (71.2 g.) was added methanol (100 cc.) and the solution stirred. Crystallisation started immediately and continued overnight. The crystalline solid was filtered off and washed on the filter with very little methanol to give almost colourless washings. The white crystalline solid (first crop) weighed 46.6 g. (71.5% of theoretical), M.P. 55–57°. The mother liquor (without the washings) was kept overnight at —9°. The second crop of a white crystalline solid was filtered off weighing 7.8 g. (12% of theoretical), M.P. 54–57°. On recrystallisation from petrol, B.P. 40–60°, almost white crystals, melting at 56–57°, were obtained. (Found: N, 8.46. $C_{14}H_{18}N_2O_7$ requires N, 8.59%.)

Total yield of isopropyl 2,4-dinitro-6-sec.-butylphenyl carbonate was therefore 54.4 g. (83.5% of theoretical).

By repeating this method but using sodium carbonate or potassium carbonate instead of potassium hydroxide, isopropyl 2,4-dinitro-sec.-butylphenyl carbonate was obtained in 81% yield and 91% yield respectively.

This compound has exceptionally good acaricidal activity coupled with safety to living plants, and has a very favourable mammalian toxicity: acute oral $LD_{50}$ to male mice is greater than 1500 mg./kg., acute oral $LD_{50}$ to male rats is about 400 mg./kg. body weight.

The compound was formulated as follows: 10 parts of the compound were mixed with 20 parts of Lissapol NX (a polyethylene glycol ether) and made up to 100 parts by volume with acetone. This solution was diluted with water to contain 0.001% of the compound. Dwarf bean plants were infested with 50 resistant greenhouse red spiders per plant. The plants were dipped in the diluted solution and observations were made after 48 hours, when it was found that all the spiders were dead. In parallel tests schradan (octamethylpyrophosphoramide) and parathion (O,O-diethyl O-p-nitrophenyl phosphorothioate) at concentrations of 0.05% of toxicant gave only 20% and 30% kills of this resistant spider respectively.

The compound was also formulated as a 50% wettable powder as follows: a mixture of 50 parts of the toxicant, 7 parts of finely divided synthetic calcium silicate, 6 parts of powdered calcium salt of sulphite cellulose waste liquor, 0.5 part of 80% sodium lauryl sulphate and 38.5 parts of china clay having a state of subdivision such that at least 95% thereof passes through a 300 mesh B.S.S. sieve, was intimately mixed and ground. When required for use the powder was mixed with water to give the desired concentration. When diluted to 0.001% of the toxicant and sprayed on bean plants infested with resistant greenhouse red spider it gave a complete kill of spider after 48 hours.

The compound was also effective against *Plutella maculipennis* giving a complete kill of the second and third instar at a concentration of 0.05% of toxicant.

The compound gave complete protection against cucumber powdery mildew (*Erysiphe cichoracearum*) at a concentration of 0.05% of the toxicant and against apple mildew (*Podosphaera leucotricha*), with no phytotoxicity to the foliage or fruit.

A conventional thermal fumigating device was prepared containing 30% by weight of the toxicant in admixture with potassium chlorate, lactose and china clay. The quantity of toxicant was calculated so that, on ignition, it yielded 1 g. of toxicant in 1000 cubic feet of space. Cucumber plants infested with resistant greenhouse red spider were placed in a cubicle and the device ignited. Observations after 48 hours were made when it was found that all the spider was killed.

An aerosol was prepared in which the toxicant was dissolved in acetone to give a 10% w./v. solution. This was dispersed with the aid of compressed air to yield 1 g. of toxicant per 1000 cubic feet. This was applied to cucumber plants infested with resistant greenhouse red spiders. After 48 hours it was found that all the spiders were killed. No phytotoxicity to the plants was observed from these treatments.

The product was also formulated as an emulsifiable concentrate as follows: 3 lbs. of the toxicant were mixed with 0.75 lb. of a blend of an aryl alkyl sulphonate, an alkyl aryl polyethylene oxide ether and an alkyl polyethylene oxide ether and made up to 1 gallon with coal tar naphtha, 90% of which boils below 190°. This gave similar acaricidal and fungicidal results to those given by the wettable powder.

EXAMPLE 2

*1-methylheptyl-2,4-dinitro-6-sec.-butylphenyl carbonate*

To a solution of 2,4-dinitro-6-sec.-butylphenol (60 g.) dissolved in ether (500 cc.) was added pyridine (20 g.) and then, while cooling and stirring, a solution of octan-2-yl chloroformate (48 g.) in ether (100 cc.). Pyridine hydrochloride precipitated immediately and was filtered off and the ethereal solution washed with dilute hydrochloric acid, then with water. The ethereal solution was then dried over anhydrous sodium sulphate, filtered, and the ether removed leaving a clear brownish oil, weighing 98 g. (theory requires 99 g.). It had a refractive index $n_D^{20}$ 1.5021. (Found: N, 7.05. $C_{18}H_{27}N_2O_7$ requires N, 7.07%.)

This oil was formulated as a 25% wettable powder as follows: 25 parts of the oil, 15 parts of a polyoxyethylene oleate, 20 parts of finely divided synthetic calcium silicate and 40 parts of finely divided china clay (as described in Example 1) were mixed and ground. When diluted to 0.01% and applied to resistant greenhouse red spider on dwarf beans it gave complete kill of the spider. Moreover this compound was effective against fruit tree red spider (*Panonychus ulmi*) giving a complete kill of spider adults when fruit trees in orchards were sprayed with this wettable powder at a concentration of 0.025% of the toxicant. It caused no damage to foliage or fruit.

Using the general method of Example 2, further compounds of the general Formula VII below were prepared by reaction of the corresponding phenol with the appropriate chloroformic acid ester.

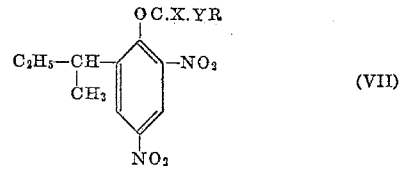

(VII)

For the sake of convenience the nature of the products, their characteristics and yields obtained, together with biological results are shown in Table I.

The abbreviation "W.P." indicates wettable powder which, in the case of the 12.5% W.P. was prepared as follows: 12.5 parts of the compound, 0.25 part of 80% sodium lauryl sulphate, 6 parts of powdered calcium salt of sulphite cellulose waste liquor, and 81.25 parts of fine china clay (described in Example 1) were intimately mixed and ground. The other W.P.'s were prepared in like manner.

In order to prepare a 5% miscible preparation 5 parts of the compounds were mixed with 10 parts of Lissapol NX and made up to 100 parts by volume with acetone or another suitable solvent. Other miscible preparations are made using a similar procedure.

TABLE I

| Ex. No. | X | Y | R | M.P., °C. | $n_D^{20}$ | Yield percent | Formulation | Resistant greenhouse red spider Conc., percent | Resistant greenhouse red spider Kill, percent | Erysiphe cichoracearum Conc., percent | Erysiphe cichoracearum Protection, percent | Podosphaera leucotricha Conc., percent | Podosphaera leucotricha Protection, percent |
|---|---|---|---|---|---|---|---|---|---|---|---|---|---|
| 3 | O | O | $CH_3$ | [1] 59-61 | | 90 | 12.5% W.P. | 0.001 | 98 | | | 0.05 | 100 |
| 4 | O | O | $C_2H_5$ | (²) | | 91.5 | 5% miscible. | 0.001 | 99 | | | | |
| 5 | O | O | $n-C_4H_9$ | [3] 57-58 | | 91.5 | ...do...... | 0.005 | 97 | | | | |
| 6 | O | O | $n-C_7H_{15}$ | | 1.5081 | 100 | ...do...... | 0.005 | 98 | | | | |
| 7 | O | O | $n-C_8H_{17}$ | | 1.5069 | 99 | 12.5% W.P. | 0.01 | 100 | | | 0.05 | 100 |
| 8 | O | O | $n-C_{10}H_{21}$ | | 1.5031 | 89 | 10% miscible. | 0.005 | 97 | | | | |
| 9 | O | O | $n-C_{18}H_{37}$ | (²) | | 100 | 5% miscible. | 0.01 | 100 | | | | |
| 10 | O | O | $CH(CH_3)—C_3H_7$ | [1] 46-48 | | 100 | 25% W.P. | 0.005 | 100 | 0.05 | 98 | 0.05 | 99 |
| 11 | O | O | $CH(CH_3)C_2H_5$ | | 1.5153 | 97 | 12.5% W.P. | 0.001 | 100 | 0.05 | 99 | 0.05 | 100 |
| 12 | O | O | {$CH_2CH_2CH(CH_3)CH_3$, 85%, $CH_2CH(CH_3)—CH_2CH_3$, 15%} | | 1.5160 | 92 | 25% W.P. | 0.001 | 98 | | | 0.05 | 100 |
| 13 | O | O | $CH_2CH_2CH(CH_3)CH_2C(CH_3)_3$ | | 1.5093 | 91.5 | 5% miscible. | 0.01 | 99 | | | | |
| 14 | O | O | $CH_2CH_2Cl$ | [3] 77-79 | | 86 | ...do...... | 0.005 | 99 | | | | |
| 15 | O | O | $CH_2CH_2OC_2H_5$ | [4] 52-53 | | 87 | ...do...... | 0.005 | 100 | | | | |
| 16 | O | O | $CH_2—CH:CH_2$ | | 1.5330 | 91 | 10% miscible. | 0.001 | 93 | | | | |
| 17 | O | O | $CH_2CHBr—CH_2Br$ | | 1.5651 | 79 | 5% miscible. | 0.005 | 100 | | | | |
| 18 | O | O | $CH_2C_6H_5$ | [3] 79-80.5 | | 55 | ...do...... | 0.01 | 90 | | | | |
| 19 | O | O | $C_6H_5$ | [3] 63.5-65 | | 44 | 10% miscible. | 0.01 | 95 | | | | |
| 20 | O | O | P-chlorophenyl | [3] 114-115 | | 50 | 5% miscible. | 0.005 | 92 | | | | |
| 21 | O | O | Cyclohexyl | [3] 88-90 | | 77 | ...do...... | 0.01 | 87 | (⁵) | 94 | | |
| 22 | O | O | α-Naphthyl | | 1.6030 | 99 | 10% miscible. | 0.01 | 100 | | | | |
| 23 | O | S | $C_2H_5$ | [4] 42-44.5 | | 98 | 5% miscible. | 0.01 | 98 | (⁵) | 100 | | |
| 24 | S | S | $CH_3$ | [3] 85-86 | | 41.5 | ...do...... | 0.01 | 93 | | | | |
| 25 | S | S | $C_2H_5$ | | 1.5954 | 99 | ...do...... | 0.05 | 96 | | | | |
| 26 | S | O | $C_2H_5$ | | 1.5571 | 98 | ...do...... | 0.001 | 86 | | | | |

[1] From methanol. [2] Low melting solid. [3] From di-isopropyl ether. [4] From petrol, B.P., 30-40°. [5] 5% dust.

Using the general method of Example 1 further compounds of the general Formula VII above were prepared by reaction of potassium phenoxide of the formula

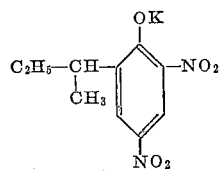

with the appropriate chloroformic acid ester.

When the final product was found to be contaminated with unreacted 2,4-dinitro-6-sec.-butylphenol, the product was dissolved in benzene and stirred for several hours with excess powdered potassium hydroxide or anhydrous potassium carbonate. The benzene solution was then filtered from the solid consisting of excess of potassium hydroxide or potassium carbonate and potassium 2,4-dinitro-6-sec.-butylphenoxide and the benzene removed from the filtrate under reduced pressure.

EXAMPLE 29

*p-Nitrophenyl 2,4-dinitro-6-sec.-butylphenyl carbonate*

This compound was prepared from p-nitrophenyl chloroformate and 2,4-dinitro-6-sec.-butylphenol according to the method described in Example 2, but using dimethylaniline instead of pyridine. p-Nitrophenyl 2,4-dinitro-6-sec.-butylphenyl carbonate was obtained as a dark brown oil, $n_D^{20}$ 1.571, in 99% yield. It was formulated as a 5% miscible and gave 99% kill of resistant greenhouse red spider at a concentration of 0.005% of the toxicant.

EXAMPLE 30

*2-mercaptobenzthiazolyl 2,4-dinitro-6-sec.-butylphenyl carbonate*

This compound was prepared from 2-mercaptobenzthiazolyl chloroformate and 2,4-dinitro-6-sec.-butylphenol using the method described in Example 29. The desired compound was obtained as a solid melting at 163–165° after recrystallisation from ethyl acetate. (N as nitrogroups—Found: N, 6.3; required N, 6.5%.) It was

TABLE II

| Example No. | X | Y | R | M.P., °C. | Yield, percent | Formulation | Resistant greenhouse red spider Conc., percent | Resistant greenhouse red spider Kill, percent | Erysiphe cichoracearum Conc., percent | Erysiphe cichoracearum Protection, percent | Podosphaera leucotricha Conc., percent | Podosphaera leucotricha Protection, percent |
|---|---|---|---|---|---|---|---|---|---|---|---|---|
| 27 | O | O | α-Tetrahydrofurfuryl | 39-41 | 93 | 12.5% W.P. | 0.0005 | 100 | 0.05 | 98 | 0.05 | 100 |
| 28 | O | S | $CH_3$ | [1] 62-65 | 78 | 25% W.P. | 0.0005 | 100 | 0.05 | 99 | 0.05 | 100 |

[1] From petrol, B.P., 40-60°.

formulated as a 12.5% wettable powder and it gave 87% kill of resistant greenhouse red spider at a concentration of 0.01% of the toxicant.

EXAMPLE 31

*N,N-diethylaminoethyl 2,4-dinitro-6-tert.-butylphenyl carbonate*

To a solution of phosgene in ether (20% w./v.; 20 cc.) was added a solution of diethylaminoethanol (3.9 g.) in ether (10 cc.), while stirring, at about 0° C. The solid that precipitated was washed with ether by decantation and to a suspension of this solid in ether was added a solution of potassium 2,4-dinitro-6-tert.-butyl phenoxide (9.3 g.) in acetone (50 cc.). Stirring was continued for two hours and the mixture filtered from the solid. The filtrate was evaporated to dryness, and the residue recrystallised from isopropanol. It was then dissolved in methanol, neutralised to pH 7 with N/2 alcoholic potassium hydroxide. Methanol was then evaporated off and the residue extracted with benzene. The benzene solution was filtered off from the soluble solid, the benzene evaporated off and the remaining residue recrystallised from di-isopropyl ether. Pale yellow needles, M.P. 120–121° were obtained.

EXAMPLE 32

*β-ethylthioethyl 2,4-dinitro-6-sec.-butylphenyl carbonate*

This compound was prepared by reacting potassium 2,4-dinitro-6-sec.-butyl phenoxide and β-ethylthioethyl chloroformate in acetone. The precipitated potassium chloride was filtered off, acetone was removed from the filtrate, and the residue extracted with benzene. After filtration the benzene was removed from the filtrate leaving a yellow-brown oil (42% of theory), $n_D^{20}$ 1.5441.

Using the general method of Example 1 the following compounds of the general Formula VIII

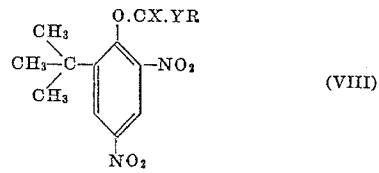

(VIII)

were prepared from 2,4-dinitro-6-tert.-butylphenol, potassium hydroxide and the appropriate chloroformate. Where necessary the reaction mixtures were refluxed until the reaction was complete and no more potassium chloride precipitated.

TABLE III

| Example No. | X | Y | R | M.P., °C. | Yield, percent | Formulation | Resistant greenhouse red spider Conc., percent | Resistant greenhouse red spider Kill, percent | Erysiphe cichoracearum Conc., percent | Erysiphe cichoracearum Protection, percent | Podosphaera leucotricha Conc., percent | Podosphaera leucotricha Protection, percent |
|---|---|---|---|---|---|---|---|---|---|---|---|---|
| 33 | O | O | $CH_3$ | [1] 98.5–99.5 | 67 | 25% W.P. | 0.005 | 98 | | | | |
| 34 | O | O | $C_2H_5$ | [2] 66.5–67.5 | 75 | do. | 0.005 | 100 | 0.05 | 94 | 0.05 | 95 |
| 35 | O | O | n-$C_4H_9$ | [3] 49–51 | 79 | 5% miscible | 0.0005 | 97 | | | | |
| 36 | O | O | {$CH_2CH_2CH(CH_3)_2$, 85% / $CH_2$—CH($CH_3$).$CH_2CH_3$, 15%} | [4] 60–61 | 91 | 25% W.P. | 0.0005 | 100 | 0.05 | 100 | 0.05 | 100 |
| 37 | O | O | $CH_2CH=CH_2$ | [1] 52–55 | 50 | 5% miscible | 0.005 | 100 | | | | |

[1] From petrol (B.P., 40–60°). [2] From petrol (B.P., 60–80°). [3] From methanol. [4] From aqueous methanol.

This material showed the following acaricidal activity: at .01% of toxicant it gave 70% kill of the resistant greenhouse red spider.

Using the general method of Example 32 the following compounds of the general Formula VIII were prepared from potassium 2,4-dinitro-6-tert.-butyl phenoxide and the appropriate chloroformate.

TABLE IV

| Example No. | X | Y | R | M.P., °C. | Yield, percent | Formulation | Resistant greenhouse red spider Conc., percent | Resistant greenhouse red spider Kill, percent |
|---|---|---|---|---|---|---|---|---|
| 38 | O | O | n-$C_6H_{13}$ | [1] 50–51 | 62 | 5% miscible | 0.001 | 98 |
| 39 | O | O | n-$C_{10}H_{21}$ | [2] 44–46 | 82.5 | do. | 0.01 | 98 |
| 40 | O | O | $CH_2CH_2Cl$ | [3] 74.5–76 | 82.5 | do. | 0.005 | 100 |
| 41 | O | O | $CH_2CH_2OH$ | [4] 162–165 | 35 | do. | 0.001 | 62 |
| 42 | O | O | $CH_2CH_2OC_2H_5$ | [5] 59–60 | 70 | do. | 0.001 | 98 |
| 43 | O | O | $CH_2CH_2OCOC_6H_5$ | [6] 101–102.5 | 65 | do. | 0.1 | 100 |
| 44 | O | O | $CH_2$-⌬ | [3] 82–83 | 55 | do. | 0.01 | 100 |
| 45 | O | O | —$CH_2.C_6H_4Cl$ | [6] 90–91 | 69 | do. | 0.01 | 82 |
| 46 | O | O | p-Tolyl | [3] 89–91 | 33 | do. | 0.01 | 98 |
| 47 | O | O | α-Naphthyl | [7] 154–155 | 25 | do. | 0.01 | 87 |

[1] From petrol (B.P., 30–40°).
[2] From methanol.
[3] From petrol (B.P., 60–80°).
[4] From methyl ethyl ketone.
[5] From petrol (B.P., 40–60°).
[6] From di-isopropyl ether.
[7] From petrol (B.P., 120–160°).

Using the general method of Example 2 the following compounds of the general Formula VIII were prepared from 2,4-dinitro-6-tert.-butylphenol and the appropriate chloroformate, but using benzene as the solvent of reaction.

Products of Example 58 (methyl 2,4-dinitro-6-sec.-amylphenyl carbonate) and of Example 75 (α-naphthyl 2,4-dinitro-6-sec.-amylphenyl carbonate) gave also 95% kill of the spores of *Venturia inaequalis* (apple scab) at a concentration of toxicant of 0.006%.

TABLE V

| Example No. | X | Y | R | M.P., °C. | $n_D^{20}$ | Yield, percent | Formulation | Resistant greenhouse red spider | | *Podosphaera leucotricha* | |
|---|---|---|---|---|---|---|---|---|---|---|---|
| | | | | | | | | Conc., percent | Kill, percent | Conc., percent | Protection, percent |
| 48 | O | O | n-C₇H₁₅ | ¹40.5-41.5 | | 95 | 25% W.P. | 0.001 | 99 | 0.05 | 98 |
| 49 | O | O | n-C₈H₁₇ | (²) | | 100 | 5% miscible | 0.01 | 100 | | |
| 50 | O | O | CH(CH₃)₂ | ³120-122 | | 60 | do | 0.005 | 73 | | |
| 51 | O | O | CH(CH₃)C₂H₅ | ⁴87-88 | | 40 | do | 0.01 | 93 | | |
| 52 | O | O | CH(CH₃)C₆H₁₃ | | 1.5103 | 93.5 | do | 0.01 | 84 | | |
| 53 | O | O | CH₂CH.BrCH₂Br | ³86.5-88.5 | | 56 | do | 0.01 | 84 | | |
| 54 | O | O | α-Tetrahydro-furfuryl | ³66-68 | | 33 | do | 0.01 | 70 | | |
| 55 | O | O | Cyclohexyl | ¹115-117 | | 55 | do | 0.01 | 43 | | |
| 56 | O | S | CH₃ | ³127-128 | | 51 | do | 0.01 | 93 | | |
| 57 | S | S | CH₃ | ³142-144 | | 30 | do | 0.01 | 73 | | |

¹ From methanol.  ² Low melting solid.  ³ From di-isopropyl ether.  ⁴ From petrol, B.P., 40-60°.

compounds of the general Formula IX

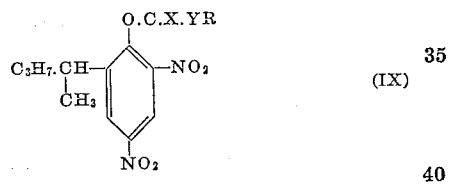

(IX)

Using the general method of Example 2, the following were obtained from 2,4-dinitro-6-sec.-amylphenol and the appropriate chloroformate.

Using the general method of Example 2 the following compounds of the general Formula X

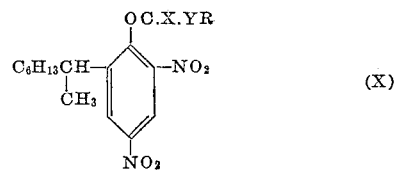

(X)

were obtained from 2-(1-methyl-n-heptyl)-4,6-dinitrophenol and the appropriate chloroformate.

TABLE VI

| Ex. No. | X | Y | R | M.P., °C. | $n_D^{20}$ | Yield percent | Formulation | Resistant greenhouse red spider | | *Erysiphe cichoracearum* | | *Podosphaera leucotricha* | |
|---|---|---|---|---|---|---|---|---|---|---|---|---|---|
| | | | | | | | | Conc., percent | Kill, percent | Conc., percent | Protection, percent | Conc., percent | Protection, percent |
| 58 | O | O | CH₃ | | 1.5375 | 79 | 25% W.P. | 0.001 | 100 | | | 0.05 | 99 |
| 59 | O | O | C₂H₅ | | 1.5230 | 89 | do | 0.001 | 100 | 0.05 | 99 | 0.05 | 100 |
| 60 | O | O | n-C₇H₁₅ | | 1.5058 | 92 | 5% miscible | 0.01 | 94 | | | | |
| 61 | O | O | n-C₈H₁₇ | | 1.5075 | 88 | do | 0.01 | 88 | | | | |
| 62 | O | O | n-C₁₀H₂₁ | | 1.5009 | 100 | do | 0.01 | 93 | | | | |
| 63 | O | O | CH(CH₃)₂ | ¹62-63 | | 98 | 25% W.P. | 0.001 | 100 | 0.05 | 100 | | |
| 64 | O | O | CH(CH₃)C₂H₅ | | 1.5132 | 100 | 5% miscible | 0.001 | 100 | | | | |
| 65 | O | O | CH(CH₃)C₃H₇ | | 1.5310 | 78 | do | 0.005 | 91 | | | | |
| 66 | O | O | CH(CH₃)C₆H₁₃ | | 1.5058 | 66 | do | 0.01 | 84 | | | | |
| 67 | O | O | {CH₂CH₂CH(CH₃)₂, 85%; CH₂CH(CH₃)CH₂CH₃, 15%} | | 1.5115 | 81 | 25% W.P. | 0.005 | 100 | | | 0.05 | 100 |
| 68 | O | O | CH₂CH₂Cl | ²78-81 | | 67 | 5% miscible | 0.005 | 100 | | | | |
| 69 | O | O | CH₂CH₂OC₂H₅ | | 1.5250 | 81 | 20% W.P. | 0.001 | 100 | | | 0.05 | 100 |
| 70 | O | O | CH₂CH=CH₂ | | 1.5320 | 83 | 5% miscible | 0.001 | 100 | | | | |
| 71 | O | O | CH₂C₆H₅ | | 1.5589 | 69 | do | 0.01 | 95 | | | | |
| 72 | O | O | α-Tetrahydro-furfuryl | | 1.5350 | 91 | do | 0.01 | 93 | | | | |
| 73 | O | O | C₆H₅ | | 1.5630 | 98 | do | 0.01 | 93 | | | | |
| 74 | O | O | p-Chlorophenyl | ³148-150 | | 16 | do | 0.01 | 50 | | | | |
| 75 | O | O | α-Naphthyl | | 1.5950 | 87 | do | 0.01 | 99 | | | | |
| 76 | O | O | Cyclohexyl | | 1.5235 | 100 | do | 0.01 | 98 | | | | |
| 77 | O | O | CH₃ | | 1.5620 | 87 | do | 0.01 | 96 | | | | |

¹ From petrol, B.P., 30-40°.  ² From methanol.  ³ From di-isopropyl ether.

TABLE VII

| Example No. | X | Y | R | $n_D^{20}$ | Yield, percent | Formulation | Resistant greenhouse red spider | | Erysiphe cichoracearum | | Podosphaera leucotricha | | Sphaerotheca pannosa | |
|---|---|---|---|---|---|---|---|---|---|---|---|---|---|---|
| | | | | | | | Conc., percent | Kill, percent | Conc., percent | Protection, percent | Conc., percent | Protection, percent | Conc., percent | Protection, percent |
| 78* | O | O | $CH_3$ | 1.522 | 100 | 20% W.P. | 0.01 | 77 | 0.0125 | 100 | 0.0063 | 100 | 0.0125 | 99 |
| 79* | O | O | $C_2H_5$ | 1.513 | 92.5 | 12.5% W.P. | 0.01 | 83 | 0.0125 | 100 | 0.0063 | 100 | 0.0125 | 100 |
| 80 | O | O | $CH(CH_3)_2$ | 1.505 | 93.5 | do | 0.1 | 95 | 0.0125 | 100 | | | | |
| 81 | O | O | $CH(CH_3)C_2H_5$ | 1.492 | 90.5 | 10% W.P. | | | 0.0063 | 100 | 0.04 | 100 | | |
| 82 | O | O | $CH(CH_3)C_6H_{13}$ | 1.502 | 96 | 12.5% W.P. | | | 0.0063 | 98 | | | | |
| 83 | O | O | α-Tetrahydrofurfuryl. | 1.514 | 94 | 5% miscible. | 0.001 | 76 | | | | | | |
| 84 | S | S | $CH_3$ | 1.563 | 93.8 | 25% W.P. | | | 0.0125 | 100 | 0.0125 | 100 | | |

*The compounds of these examples also gave virtually 100% control of *Venturia inaequalis* when applied as a 12.5% W.P. at a concentration of 0.0125% of toxicant to rootstocks infected with *Venturia inaequalis*.

EXAMPLE 85

*Methyl 2,4-dinitro-6-(1-methylheptyl)-phenyl thiolocarbonate*

To a solution of 2,4-dinitro-6-sec.-octylphenol (6.6 g.; 90% pure) in acetone (40 cc.) potassium hydroxide (1.13 g.) was added. This mixture was stirred at room temperature until a complete solution was obtained. To it a solution of methyl thiolo-chloroformate (2.2 g.) in acetone (10 cc.) was added all at once, the mixture heated under reflux for 30 minutes and allowed to stand for 16 hours at room temperature. The precipitated potassium chloride was filtered off (1.29 g.; 94.5% of theory) and the acetone removed from the filtrate under reduced pressure. A brown oil, $n_D^{20}$ 1.534, weighing 9.9 g., was obtained.

When applied to cucumber mildew (*Erysiphe cichoracearum*) as a 12.5% W.P. (wettable powder) at a concentration of 0.00625% of toxicant, it gave 98% protection. When applied as a 12.5% wettable powder at a concentration of 0.025% of toxicant to rootstocks infected with *Venturia inaequalis* it gave 94% control.

This dual activity is most important in practice. In addition the product had excellent eradicant properties against these fungal infections.

EXAMPLE 86

*Ethyl 2,4-dinitro-6-cyclohexylphenyl carbonate*

To a solution of 2,4-dinitro-6-cyclohexylphenol (5.65 g.) and pyridine (1.6 g.) in ether (200 cc.) ethyl chloroformate (2.15 g.) was added with stirring. The precipitated pyridine hydrochloride was filtered after 30 minutes and the ether evaporated off from the filtrate. The residue was recrystallised from petrol (B.P. 40–60°) yielding pale yellow prisms, M.P. 76°, of ethyl 2,4-dinitro-6-cyclohexylphenyl carbonate (3.9 g.). (Found: N, 8.1. $C_{15}H_{18}N_2O_7$ requires N, 8.3%.)

This was formulated as follows: 10 parts of the toxicant were mixed with 15 parts of Lissapol NX and made up to 100 parts by volume with acetone. 80% kill of resistant greenhouse red spider was obtained at a concentration of 0.01% of the toxicant.

A 5% dust containing 5 parts of the product and 95 parts of china clay applied to cucumbers gave 99% protection from *Erysiphe cichoracearum*.

EXAMPLE 87

*Methyl 2,4-dinitro-6-phenylphenyl carbonate*

To a mixture of 2,4-dinitro-6-phenylphenol (5.2 g.), pyridine (1.63 cc.) and tetrahydrofuran (150 cc.) was added, with shaking, methyl chloroformate (1.89 g.). The mixture was set aside for 24 hours at room temperature, then filtered. Tetrahydrofuran was distilled off from the filtrate and the residue recrystallised from di-isopropyl ether to yield 3.6 g. of a solid, M.P. 123–124.5°. (Found: N, 8.8. $C_{14}H_{10}N_2O_7$ requires N, 8.8%.)

It gave 90% kill of aphids at a concentration of 0.1% of the toxicant.

In addition this compound showed excellent fungicidal activity against the spores of *Venturia inaequalis*, *Botrytis cinerea*, and *Fusarium bulbigenum*. The test used was that described by Montgomery and Moore, J. Pomol., 1938, 15, 253.

EXAMPLE 88

*Ethyl 2,4-dinitro-phenylphenyl carbonate*

The conditions of preparation were as described in Example 87, except that ethyl chloroformate (2.2 g.) was used. Yellow-brown crystals of ethyl 2,4-dinitro-6-phenylphenyl carbonate were obtained from di-isopropyl ether, M.P. 111–113° weighing 4.35 g. (66% of theoretical). (Found: C, 54.6; H, 3.8; N, 8.5. $C_{15}H_{12}N_2O_7$ requires C, 54.2; H, 3.6; N, 8.4%.)

A kill of 90% of aphids was obtained at a concentration of 0.1% of the toxicant.

EXAMPLE 89

*Methyl 2,4-dinitro-6-phenylphenyl thiolothionocarbonate*

To a solution of 2,4-dinitro-6-phenylphenol (15.6 g.) and pyridine (4.9 cc.) in hot benzene (600 cc.), a solution of methyl thiolothionochloroformate (7.59 g.) in benzene (20 cc.) was added. The mixture was allowed to stand for 24 hours. Water was added to the reaction mixture, the benzene layer separated, dried over anhydrous sodium sulphate, filtered, the benzene removed under reduced pressure from the filtrate and the residue recrystallised from alcohol yielding a crystalline solid melting at 132–133° (weight, 6.4 g.). (Found: N, 7.7. $C_{14}H_{10}N_2O_5S_2$ requires N, 8.0%.)

It gave a complete kill of resistant greenhouse red spider at a concentration of 0.01%.

EXAMPLE 90

*Ethyl 2,4-dinitro-6-isopropylphenyl carbonate*

This compound was prepared as described in Example 2 from 2,4-dinitro-6-isopropylphenol and ethyl chloroformate. The oil that was obtained crystallised on standing. On recrystallisation from petrol (B.P. 30–40°) pale yellow prisms were obtained, M.P. 58.5–59° (60% yield). (Found: N, 9.1. $C_{12}H_{14}N_2O_7$ requires N, 9.4%.)

It gave a complete kill of resistant greenhouse red spider at a concentration of 0.01% of toxicant.

EXAMPLE 91

*Ethyl 2,6-dinitro-4-tert.-butylphenyl carbonate*

This compound was prepared as described in Example 2 from 2,6-dinitro-4-tert.-butylphenol and ethyl chloroformate, using benzene instead of ether as solvent of reaction. On recrystallisation from alcohol a crystalline solid was obtained, M.P. 78–79° (76% yield). (Found: N, 8.9. $C_{13}H_{17}N_2O_7$ requires N, 8.9%.)

It gave 80% kill of resistant greenhouse red spider at 0.005%.

EXAMPLE 92

*Isopropyl 2,6-dinitro-4-tert.-butylphenyl carbonate*

This compound was prepared as in the case of Example 91, but using isopropyl chloroformate. A crystalline solid was obtained, M.P. 97–98° (89% yield). (Found: N, 8.2. $C_{14}H_{19}N_2O_7$ requires N, 8.5%.)

EXAMPLE 93

*Isopropyl 2,4-dinitro-6-sec.-butylphenyl carbonate*

2,4-dinitro-6-sec.-butylphenol (12.0 g.), potassium carbonate (3.53 g.) and isopropyl chloroformate (5.4 g.) were refluxed with stirring in acetone (50 cc.) for 3¼ hours. After this time the precipitated potassium chloride was filtered off and the filtrate evaporated to dryness in vacuo. The residue was dissolved in methanol and allowed to crystallise. The desired compound (M.P. 55–58°) was obtained in a yield of 96%.

The following results were obtained by dipping plants infested with resistant greenhouse red spider, in order to demonstrate the ovicidal action of the compounds:

| Compound of Example No. | Formulation | Ovicidal action | |
|---|---|---|---|
| | | Conc. of toxicant, percent | Kill of eggs, percent |
| 33 | 25% W.P. | 0.025 | 96 |
| | | 0.01 | 71 |
| | | 0.005 | 63 |
| 34 | 12.5% W.P. | 0.025 | 94 |
| | | 0.01 | 77 |
| | | 0.005 | 69 |
| 36 | 25% W.P. | 0.025 | 89 |
| | | 0.01 | 84 |
| | | 0.005 | 67 |
| 48 | 25% W.P. | 0.025 | 87 |
| | | 0.01 | 65 |
| | | 0.005 | 52 |
| 58 | 25% W.P. | 0.025 | 94 |
| | | 0.01 | 87 |
| | | 0.005 | 84 |
| 63 | 25% W.P. | 0.025 | 87 |
| | | 0.01 | 85 |
| | | 0.005 | 68 |

We claim:
Isopropyl 2,4-dinitro-6-sec.-butylphenyl carbonate.

References Cited by the Examiner

UNITED STATES PATENTS

| | | | |
|---|---|---|---|
| 2,335,237 | 11/1943 | Conzetti | 260—463 |
| 2,787,631 | 4/1957 | Stevens | 260—463 |
| 2,978,448 | 4/1961 | Hasspacher | 260—463 |
| 3,123,522 | 3/1964 | Scherer et al. | 260—463 |
| 3,130,037 | 4/1964 | Scherer et al. | 71—2.6 |

OTHER REFERENCES

Chappell et al.: Chem. Abstracts, vol. 50 (1956), column 9670 (abstract of Plant Disease Reptr. 40 (1956), pages 52–6.

Kinugawa et al.: J. Pharm. Soc., Japan, vol. 79 (1959), pages 931–3.

Kinugawa et al.: J. Pharm. Soc., Japan, volume 79 (1959), pages 933–7.

NICHOLAS S. RIZZO, *Primary Examiner.*

IRVING MARCUS, *Examiner.*